April 4, 1967 G. C. GODEJAHN, JR 3,312,879

SEMICONDUCTOR STRUCTURE INCLUDING OPPOSITE CONDUCTIVITY SEGMENTS

Filed July 29, 1964 2 Sheets-Sheet 1

INVENTOR.
GORDON C. GODEJAHN JR.

BY A. M. Fernandez

ATTORNEY

April 4, 1967 G. C. GODEJAHN, JR 3,312,879
SEMICONDUCTOR STRUCTURE INCLUDING OPPOSITE CONDUCTIVITY SEGMENTS
Filed July 29, 1964 2 Sheets-Sheet 2

INVENTOR.
GORDON C. GODEJAHN JR.
BY A. M. Fernandez
ATTORNEY

United States Patent Office 3,312,879
Patented Apr. 4, 1967

3,312,879

SEMICONDUCTOR STRUCTURE INCLUDING OPPOSITE CONDUCTIVITY SEGMENTS

Gordon C. Godejahn, Jr., Santa Ana, Calif., assignor to North American Aviation, Inc.

Filed July 29, 1964, Ser. No. 385,890
8 Claims. (Cl. 317—234)

This invention relates to a crystalline structure having electrically isolated semiconductor segments of opposite conductivity type, and methods of making same and more particularly to a crystalline substrate with embedded semiconductor segments which have been so derived from N and P-type high quality, single crystal, semiconductor wafers that desired electrical characteristics are provided for the segments from which integrated circuit devices are to be fabricated.

Epitaxial-diffused and triple-diffused structures have been employed in the past to fabricate monolithic integrated circuits having opposite conductivity type semiconductor devices such as paired NPN and PNP transistors. For instance, starting with a single-crystal wafer of one conductivity type, such as N-type silicon, the collector base and emitter regions of one transistor are diffused, while only the base and emitter of the other transistor are diffused. The result is the production of two transistors not properly matched because the diffused collector of one is provided with a graded impurity profile while the grown collector of the other is provided with a uniformly distributed impurity profile. In the fabrication of the ideally matched NPN and PNP transistors, it would be advantageous to start with a single-crystal semiconductor having adjacent N and P regions of uncompensated, homogeneous resistivity.

An object of this invention is to provide a monolithic-like crystalline structure having at least two single-crystal semiconductor segments of opposite conductivity types with uncompensated homogeneous resistivity on a common substrate.

A further object is to provide electrically isolated single-crystal semiconductor segments of opposite conductivity types on a common substrate of thermally compatible isolating material.

Still another object is to provide segments of single-crystal semiconductor wafers of opposite conductivity types joined by thermally compatible isolating material on a common substrate.

Still another object is to provide methods of achieving the foregoing objects.

In accordance with one embodiment of the invention, N and P-type single-crystal Czochralski-grown or Float Zoned silicon segments are joined in a monolithic-like structure by vapor deposited silicon. It should of course be understood that other thermally compatible, isolating material may be vapor deposited, such as beryllium oxide, in combination with any of the semiconductive materials known to be suitably adapted to the fabrication of devices for integrated circuits, such as germanium. By thermal compatibility it is meant that the thermal characteristics of the isolating material be matched closely enough to the characteristics of the semiconductor employed so that deleterious stresses, strains, separations, fractures or deformations will not result, either in the isolating material or the semiconductor, during the process of fabrication of, for example, diffused junctions at temperatures in the range of 700 to 1300° C., and the structure and functioning of the circuit fabricated is not impaired as a consequence of wide variations in processing and operating temperatures.

In the preferred embodiment of the invention, each segment is coated with an insulating film of thermally compatible material on all surfaces except its obverse side to improve the electrical isolation between segments. Although an oxide film, such as silicon dioxide, is employed in the preferred embodiment, it should be understood that other insulating materials, such as a silicon nitride, may be employed. The isolating material deposited on the oxidized segments to join them in a monolithic-like structure is preferably silicon, particularly if silicon is selected for the semiconductor segments but, as noted hereinbefore, other isolating materials may be employed and the insulating film which improves isolation need not be provided where adequate isolation is provided by the joining material, as by providing a sufficiently thick deposit of beryllium oxide between the segments.

Since Czochralski wafers have a radial resistivity gradient, it is desirable to obtain the semiconductor segments to be joined at the same radius from the center of the respective wafers. Once the segments are thus selected, they may be joined in an arbitrary pattern. However, for purposes of simiplicity, the preferred embodiment of the invention will be illustrated by a process in which the N and P-type segments are selected from two different Czochralski-grown crystal wafers at the same radius and joined in a symmetrical pattern.

The invention may be better understood from the following description of an illustrative process of fabrication with reference to the drawings in which.

Figure 1:
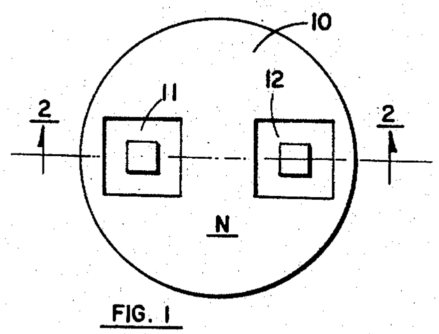
FIGURES 1 to 5 illustrate in various stages of fabrication a semiconductor wafer of one conductivity type from which segments are prepared for joining with segments of a semiconductor wafer of another conductivity type.

As just noted, the basic steps of two illustrative processes for joining isolated segments of N and P-type semiconductor crystals in a monolithic-like structure are shown in the drawings. In general, the first process consists principally of: (1) selecting two opposite conductivity type wafers of the appropriate resistivity; (2) isolating segments of the N-type semiconductor in an arbitrarily selected pattern; (3) producing an arbitrarily selected pattern of holes in the N-type semiconductor and a corresponding array of mesas in the P-type semiconductor; (4) placing the mesas of the P-type semiconductor in the holes of the N-type semiconductor and, through the reverse side of the N-type semiconductor, joining the mesas of the P-type semiconductor to the N-type semiconductor by depositing isolating crystalline material; (5) and finally removing, as by lapping or etching, the P-type semiconductor material joining the mesas until the isolated N-type semiconductor segments are exposed and the mesas emerge as isolated P-type semiconductor segments on the obverse side of the structure.

Figure 2:
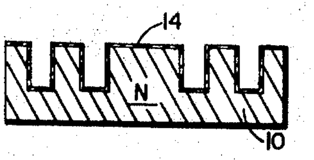
Figure 3:
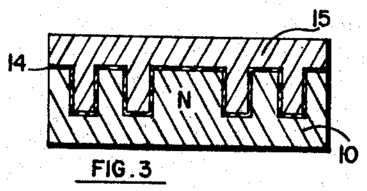
Figure 4:
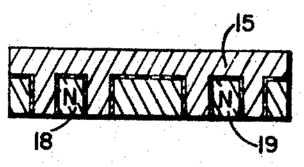

The process for isolating segments of an N-type semiconductor wafer 10 comprises the steps of; (a) forming grooves or isolating channels 11 and 12 on the reverse side of the wafer in a pattern outlining the desired semiconductor segments as shown in FIGURE 1; (b) oxidizing the reverse side of the semiconductor wafer including the surfaces of the isolating channels to provide an electrically insulating film 14 as shown in FIGURE 2 in a cross-section taken on the line 2—2 of the semiconductor wafer of FIGURE 1; (c) depositing an isolating material 15 on the insulating film 14 as shown in FIGURE 3;

and (d) removing a part of the semiconductor 10 from its obverse side to expose the isolating material in the channels around the desired N-type semiconductor segments 18 and 19 as shown in FIGURE 4.

The details of that process for electrically isolating segments of a semiconductor wafer are more fully described in a co-pending application Serial No. 339,717 filed by McWilliams et al. on January 23, 1964, and assigned to the assignee of this application. Briefly, in a preferred process for isolating the segments 18 and 19 on a common crystalline substrate 15, the first step consists of etching the isolating channels 11 and 12 in the N-type silicon single crystal wafer 10 which is then oxidized to provide a silicon dioxide insulating film. A substrate or crystalline silicon is then vapor deposited on the oxide film. As noted in the aforementioned co-pending application, the insulating film may be silicon nitride instead of silicon dioxide and the isolating substrate material may be any other thermally compatible, vapor deposited crystalline material such as beryllium oxide or alumina. As further noted in that co-pending application, the insulating film of silicon dioxide or silicon nitride may be omitted, particularly if the isolating material employed sufficiently high resistivity, such as beryllium oxide. The last step in isolating segments of the semiconductor wafer 10 is to lap back the obverse side of the wafer 10 until the substrate material is exposed in the isolating channels. Immediately the obverse side of the resulting structure shows the isolated segments 18 and 19 embedded in the isolating substrate material 15 with an electrically isolating film 14 on all embedded sides of the segments as shown in FIGURE 5.

If desired, a low-resistivity N+ layer may be provided, as by diffusion, on the reverse side of the wafer 10 before the isolating channels are etched.

Figure 5:
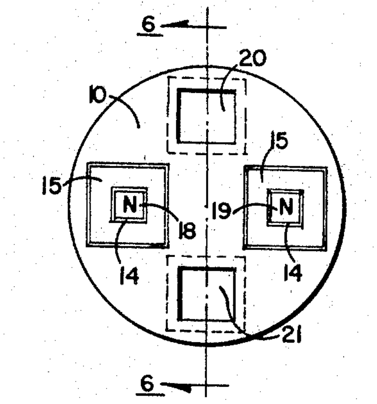

To produce electrically isolated semiconductor segments of the P-type joined with the segments 18 and 19 of the N-type in a monolithic-like crystalline structure having a common substrate, the next step of the first process is to cut holes 20 and 21 through the structure of FIGURE 5 in the arbitrary pattern desired for the placement of the P-type semiconductor segments. In this illustrative process, a P-type Czochralski grown or Float Zoned, single-crystal silicon wafer of approximately the same diameter as the N-type wafer 10 is selected for the P-type segments. Since such wafers have a radial resistivity gradient, the P-type segments are to be taken from the P-type wafer preferably at approximately the same radius as the N-type segments 18 and 19 isolated from the wafer 10. In that manner, the P and N-type segments joined together in a monolithic-like structure will have the same resistivity characteristics.

Figure 6:
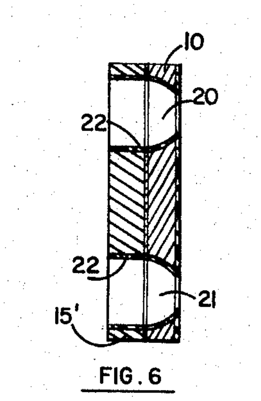
FIGURES 6 to 9 illustrate in various stages of fabrication the steps of preparing semiconductor segments of the other conductivity type and joining those segments with the semiconductor segments of the first conductivity type.
Figure 7:
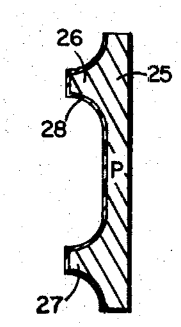

FIGURE 7 illustrates a cross-section of a P-type silicon wafer 25 with two mesas 26 and 27 etched on the reverse side thereof at positions which correspond to positions of the holes 20 and 21 in the structure of FIGURE 5. The etched side of the P-type silicon wafer 25 is oxidized to provide a silicon dioxide film 28 over the mesas 26 and 27. As with the N-type wafer 10, a low-resistivity $P^+$ layer may be provided on the reverse side of the wafer 25 before etching and oxidizing the mesas 26 and 27. FIGURE 6 shows a cross-section taken on the line 6—6 of the resulting structure shown in FIGURE 5. The cross sectional views of FIGURES 6 and 7 are shown with the obverse side of the structure of FIGURE 6 facing the reverse or mesa side of the P-type silicon wafer of FIGURE 7.

Figure 8:
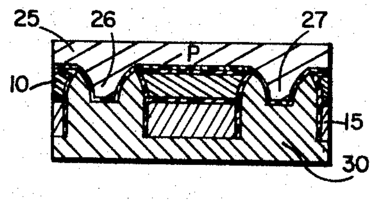

The next step in the process is to place the mesas 26 and 27 into the holes 20 and 21 with the obverse side of the structure in FIGURE 6 facing the reverse side of the structure in FIGURE 7, and then deposit isolating material 30 around the mesas through the reversed side of the structure of FIGURE 5 as shown in FIGURE 8. The isolating material may be vapor deposited silicon. It surrounds the mesas 26 and 27 as well as the isolating material 15 deposited on the N-type wafer 10 in the step illustrated in FIGURE 3 and all of the oxidized N-type wafer 10.

Figure 9:
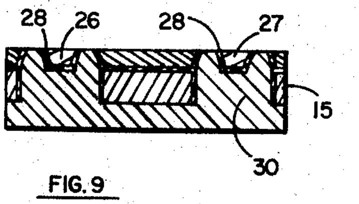
Figure 10:
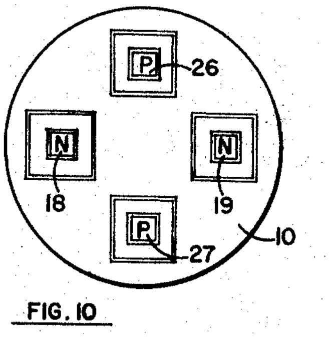
FIGURE 10 shows the semiconductor segments of opposite conductivity type joined by isolating material on a monolithic-like crystalline structure.

In the next step the obverse side of P-type wafer 25 is cut back as by etching or lapping to expose the deposited isolating material 30 surrounding the mesas 26 and 27, thereby leaving the mesas as isolated P-type segments embedded in the isolating material 30. Since the isolating material 15 deposited in the step illustrated by FIGURE 3 is the same as the isolating material 30 deposited in the step illustrated by FIGURE 8, it may be seen that the P-type segments 26 and 27 are joined to the N-type segments 18 and 19 by an isolating material 30 which provides a common crystalline substrate as shown in FIGURE 9. The obverse side of the resulting structure of FIGURE 9 is illustrated in FIGURE 10.

In practice, a larger number of isolated semiconductor segments of opposite conductivity types would be joined in a monolithic-like structure. In that regard, it should be noted that the dimensions and proportions used in the drawings were selected for ease of illustration only and are not to be taken as representative of proportionate dimensions employed in the actual fabrication of such isolated semiconductor segments.

The second process of producing isolated semiconductor segments of opposite conductivity type in a monolithic-like crystalline structure is illustrated in various stages of fabrication by FIGURES 11 to 18. It differs from the first process described with reference to FIGURES 1 to 10 in that the P-type segments are isolated in a monolithic-like crystalline structure before the N-type segments are isolated.

Figure 11:
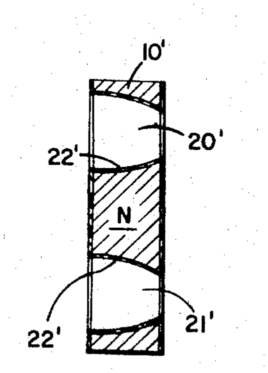
FIGURES 11 to 18 illustrate in various stages of fabrication the production of isolated semiconductor segments of opposite conductivity type in a monolithic-like crystalline substrate by a second process.
Figure 12:
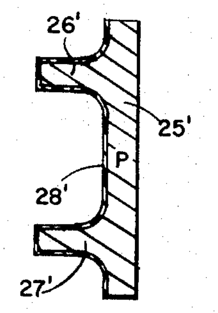

The first step after selecting the N and P-type single-crystal wafers 10' and 25', illustrated by FIGURES 11 and 12, is to produce holes 20' and 21' in the N-type wafer 10' and to produce mesas 26' and 27' in the P-type semiconductor wafer 25'. Both wafers are then oxidized to provide an insulating film 22' all over the N-type wafer, including the holes, and an insulating film 28' on at least the mesa side of the P-type wafer.

Figure 13:
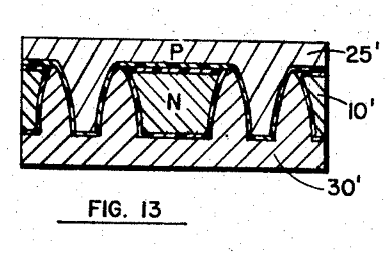
Figure 14:
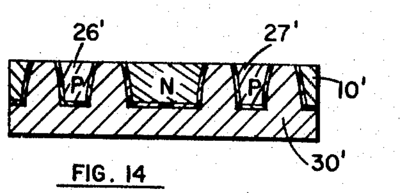

The next step illustrated by FIGURE 13 is analogous to the step of the first process illustrated by FIGURE 8, which is to place the mesas of the P-type wafer 25' in the holes of the N-type wafer 10' and to join the two wafers by depositing an isolating material 30' in the holes around the mesas. A portion of the P-type wafer 25' is then removed, thereby exposing the isolating material around the mesas 26' and 27' as illustrated in FIGURE 14, and more fully illustrated by FIGURE 15 which shows in a top view of the structure of FIGURE 14 the tops of the isolated mesas 26' and 27' surrounded by isolating material 30'.

Figure 15:
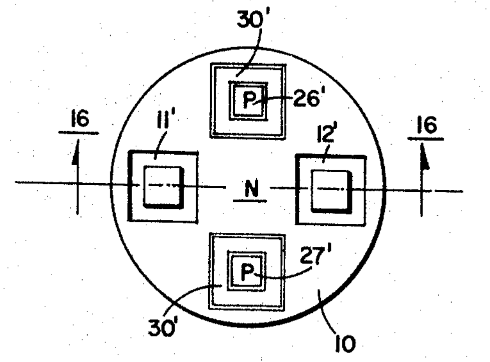
Figure 16:
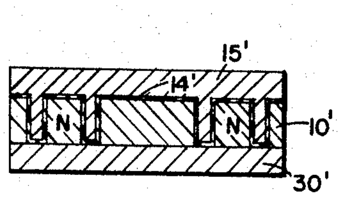
Figure 18:
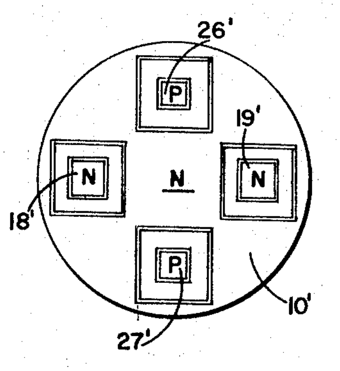
Figure 17:
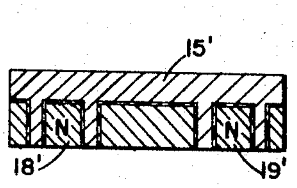

The last step is to isolate in the monolithic-like crystalline structure of FIGURE 15 segments of the N-type wafer 10'. That is accomplished by producing isolating channels 11' and 12' in the N-type wafer in an arbitrary pattern of the isolated segments desired as shown in FIGURE 15. The next operation in isolating segments of the N-type wafer 10' is to oxidize the surface to provide an insulating film 14' and then deposit isolating material 15' as shown in FIGURE 16 in the same manner as in the steps of the first process illustrated in FIGURE 3. A portion of the resulting structure on the opposite side of the channels is then removed until the isolating material 15' in the channels is exposed on that side, the observe side of the final structure, as illustrated in FIGURE 17. That observe side is shown in FIGURE 18 which corresponds to the final structure of the first process illustrated in FIGURE 10.

While the principles of the invention have now been made clear in two illustrative embodiments, there will be immediately obvious to those skilled in the art many modifications in structure, arrangement, processess, proportions and materials. For example, the single-crystal semiconductor segments may be cut from crystals grown epitaxially as well as by other known methods, or combination of methods. Such single-crystal segments may initially include low-resistivity N+ or P+ layers, or layers of opposite conductivity. The appended claims are therefore intended to cover and embrace any such modifications, within the limits only of the true spirit and scope of the invention.

What is claimed is:

1. Single-crystal semiconductor segments of opposite conductivity types joined together in a monolithic-like crystalline structure by thermally compatible, electrically isolating, polycrystalline material on a common substrate, said segments being further isolated from said substrate and each other by a film of thermally compatible isolating material between said segments and said isolating material and wherein each of said segments has homogeneous resistivity.

2. In combination, a plurality of single-crystal semiconductor segments each having a uniformly distributed impurity profile, at least one of which is of a conductivity type opposite others, said segments being joined in a monolithic-like crystalline structure by thermally compatible, electrically isolating semiconductor material with one face of each segment exposed on an obverse side of said structure, and a common substrate of electrically insulating material on the other side of said structure.

3. In combination, a plurality of single-crystal semiconductor segments each having a uniform dopant gradient, at least one of which is of a conductivity type opposite that of the others, semiconductor electrically isolating material joining said segments in said structure with one face of each segment exposed on an obverse side of said structure, thermally compatible electrically insulating film on said segments on all embedded sides for further isolation of said segments, and a common substrate of said electrically isolating material on the other sides of said structure.

4. A monolithic-like crystalline structure for use in integrated circuit fabrication comprising a plurality of single-crystal semiconductor segments each having homogeneous resistivity, said segments being embedded in a thermally compatible polycrystalline substrate, at least one of said segments being of a conductivity type opposite the others, each segment having thermally compatible electrically insulating film on all embedded sides, one side of each segment being exposed on an obverse side of said structure.

5. A crystalline structure as defined in claim 4 wherein said insulating film is an oxide of said semiconductor segments.

6. A structure as defined in claim 4 wherein said polycrystalline substrate comprises vapor deposited silicon.

7. A structure as defined in claim 4 wherein said substrate comprises vapor deposited germanium.

8. A structure as defined in claim 4 wherein said insulating film is a nitride of said semiconductor segments.

References Cited by the Examiner

UNITED STATES PATENTS

| | | | |
|---|---|---|---|
| 2,758,263 | 8/1956 | Robillard | 317—235 |
| 2,827,599 | 3/1958 | Jochems | 317—235 |
| 3,063,129 | 11/1962 | Thomas | 317—235 |
| 3,117,260 | 1/1964 | Noyce | 317—235 |
| 3,145,454 | 8/1964 | Dacey et al. | 29—155.5 |
| 3,150,299 | 9/1964 | Noyce | 317—235 |
| 3,158,788 | 11/1964 | Last | 317—235 |
| 3,169,892 | 2/1965 | Lemelson | 317—235 |
| 3,184,831 | 5/1965 | Siebertz | 29—155.5 |
| 3,193,418 | 7/1965 | Cooper et al. | 317—235 |

OTHER REFERENCES

Electronics Engineering Edition, "Copper Is Temporary Base For Inlaid Circuits," Aug. 15, 1958 (pages 110–113).

Electronic News, "Full Isolated Integrateds Evolved by Radiation Inc." Apr. 20, 1964, page 42.

Semiconductor Products, "Integrated Semiconductor Networks in Electromechanical Control Systems," by Abbott et al., October 1963, vol. 6, No. 10, pages 15 and 16.

Electronics Review, "Mircoelectronics, The Last Breakthrough," June 1, 1964, vol. 37, No. 17, page 23.

Electronic Design, "Silicon Integrated Circuits Steal the Show," Apr. 13, 1964 (pages 12 and 13 relied on).

JOHN W. HUCKERT, *Primary Examiner.*

J. G. CRAIG, *Assistant Examiner.*